US009839018B2

(12) United States Patent
Berggren et al.

(10) Patent No.: US 9,839,018 B2
(45) Date of Patent: Dec. 5, 2017

(54) SYSTEMS AND METHODS FOR TRANSMITTING DATA INFORMATION MESSAGES ON A DOWNLINK OF A WIRELESS COMMUNICATION SYSTEM

(71) Applicant: Futurewei Technologies, Inc., Plano, TX (US)

(72) Inventors: Fredrik Berggren, Kista (SE); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 325 days.

(21) Appl. No.: 14/320,389

(22) Filed: Jun. 30, 2014

(65) Prior Publication Data
US 2015/0009952 A1 Jan. 8, 2015

Related U.S. Application Data

(60) Provisional application No. 61/842,839, filed on Jul. 3, 2013.

(51) Int. Cl.
*H04W 4/00* (2009.01)
*H04W 72/04* (2009.01)
(Continued)

(52) U.S. Cl.
CPC ......... *H04W 72/042* (2013.01); *H04L 1/1854* (2013.01); *H04L 5/0044* (2013.01);
(Continued)

(58) Field of Classification Search
CPC ... H04L 1/1854; H04L 5/0023; H04L 5/0044; H04L 5/0053; H04L 5/1469; H04W 48/12; H04W 72/042
See application file for complete search history.

(56) References Cited

U.S. PATENT DOCUMENTS

RE44,649 E * 12/2013 Raaf ............................. 375/299
2006/0183429 A1 * 8/2006 Anderson ................. H04L 1/20
455/67.13
(Continued)

FOREIGN PATENT DOCUMENTS

WO 2012138097 A2 10/2012
WO 2013015652 A2 1/2013
WO 2013063780 A1 5/2013

OTHER PUBLICATIONS

3GPP TS 36.213, 3rd Generation Partnership Project; Technical Specification Group Radio Access Network; Evolved Universal Terrestrial Radio Access (E-UTRA); Physical Layer procedures (Release 12), Mar. 2014, 186 pages.
(Continued)

*Primary Examiner* — Kan Yuen
(74) *Attorney, Agent, or Firm* — Slater Matsil, LLP

(57) ABSTRACT

Embodiments are provide for communicating data or other non-control information messages within a downlink control channel directly, rather than in a data channel or broadcast channel. Thereby, radio resource utilization can be substantially improved in the cellular system, such as in the case of transmitting smaller data packets. In an embodiment, a transmitter arranges a set of time-frequency radio resources, associated with a downlink control channel, for transmitting information other than control information sent on the downlink control channel. The transmitter then sends, on the set of time-frequency radio resources, a data information message comprising the information other than the control information. The information other than the control information comprises one of user-specific data information and broadcast data information. A receiver then receives on the downlink control channel, control information and the data information message.

30 Claims, 5 Drawing Sheets

(51) Int. Cl.
  *H04L 1/18* (2006.01)
  *H04W 48/12* (2009.01)
  *H04L 5/00* (2006.01)
  *H04L 5/14* (2006.01)

(52) U.S. Cl.
  CPC .......... *H04L 5/0053* (2013.01); *H04L 5/0023* (2013.01); *H04L 5/1469* (2013.01); *H04W 48/12* (2013.01)

(56) References Cited

U.S. PATENT DOCUMENTS

| | | | |
|---|---|---|---|
| 2007/0270170 A1 | 11/2007 | Yoon et al. | |
| 2008/0089281 A1* | 4/2008 | Yoon | H04W 72/042 370/329 |
| 2009/0088148 A1 | 4/2009 | Chung et al. | |
| 2010/0254329 A1* | 10/2010 | Pan | H04L 5/001 370/329 |
| 2010/0304689 A1* | 12/2010 | McBeath | H04L 5/0005 455/68 |
| 2010/0316024 A1* | 12/2010 | Kiran | H04L 1/0006 370/335 |
| 2011/0149883 A1* | 6/2011 | Baker | H04L 1/1819 370/329 |
| 2012/0250551 A1* | 10/2012 | Sartori | H04W 48/12 370/252 |
| 2013/0114429 A1* | 5/2013 | Jonsson | H04L 1/0061 370/252 |
| 2013/0195041 A1* | 8/2013 | Papasakellariou | H04W 72/042 370/329 |
| 2014/0016596 A1 | 1/2014 | Kim et al. | |
| 2014/0044072 A1* | 2/2014 | Piggin | H04W 72/005 370/329 |
| 2014/0153452 A1 | 6/2014 | Son et al. | |

OTHER PUBLICATIONS

Falaki et al., "A First Look at Traffic on Smartphones" ACM 978-1-4503-0057-5/10/11, Nov. 1-3, 2010 Melbourne, Australia, 7 pages.
Huawei UMTS Small Data Packet Storm Solution Doubles Total Number of Simultaneous Subscribers, Aug. 10, 2012 11:11, 8 pages.
International Search Report and Written Opinion received in International Application No. PCT/EP2014/063990 dated Jan. 15, 2015, 18 pages.
"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Jun. 2013, pp. 1-108.
"3rd Generation Partnership Project; Technical Specification Group Radio Access Network; Evolved Universal Terrestrial Rado Access (E-UTRA); Physical Layer Procedures (Release 11)," 3GPP TS 36.213 V11.3.0, Jun. 2013, pp. 1-176.
"3rd Generation Partnership Project; Technical Specification Group Radio Access Network; Evolved Universal Terrestrial Radio Access (E-UTRA); Multiplexing and Channel Coding (Release 11)," 3GPP TS 36.212 V11.3.0, Jun. 2013, pp. 1-84.
"Handling DCI formats and blind decoding in LTE-Advanced," Nokia, Nokia Siemens Networks, 3GPP TSG-RAN WG1 Meeting #56bis, R1-091364, 15.4, Seoul, Korea, Mar. 23-27, 2009, 6 pages.
"Blind decoding in LTE-Advanced," ASUSTeK, 3GPP TSG RAN WG1 Meeting #58, R1-093280, 15.4, Shenzhen, P.R. China, Aug. 24-28, 2009, 3 pages.
"PDCCH Design for Carrier Aggregation and Post Rel-8 features," 3GPP TSG RAN1 #58, R1-093417, 15.4, Aug. 24-28, 2009, 6 pages.
"PUSCH Resource Allocation," Alcatel-Lucent Shanghai Bell, 3GPP TSG RAN WG1 Meeting #6bis, Tdoc R1-104082, 5.2.6, Dresden, Germany, Jun. 28-Jul. 2, 2010, 3 pages.

* cited by examiner

SYSTEMS AND METHODS FOR TRANSMITTING DATA INFORMATION MESSAGES ON A DOWNLINK OF A WIRELESS COMMUNICATION SYSTEM

This application claims the benefit of U.S. Provisional Application No. 61/842,839 filed on Jul. 3, 2013 by Fredrik Berggren et al. and entitled "Method for Transmitting Data Information Messages in the Downlink of a Cellular Wireless Communication System," which is hereby incorporated herein by reference as if reproduced in its entirety.

TECHNICAL FIELD

The present invention relates to the field of wireless network communications, and, in particular embodiments, to systems and methods for transmitting data information messages on a downlink of a wireless communication system.

BACKGROUND

Contemporary cellular wireless communication systems, such as $3^{rd}$ Generation Partnership Project (3GPP) Evolved Universal Terrestrial Radio Access (E-UTRA) or Long Term Evolution (LTE), include channels, such as a Physical Downlink Shared Channel (PDSCH), which comprise time-frequency resources that can be shared among users by means of a scheduler. Thus, in contrast to a dedicated channel, benefits from statistical multiplexing could be achieved by a shared channel, leading to improved overall PDSCH resource utilization. To improve the utilization of the time-frequency resources in the system, it is beneficial to allocate resources to different channel types, such as between the PDSCH and the downlink control channels, in a flexible manner to reduce the number of time-frequency resources that go unused.

SUMMARY OF THE INVENTION

In accordance with an embodiment, a method by a network component comprises arranging a set of time-frequency radio resources, which are associated with a downlink control channel, for transmitting information other than control information sent on the downlink control channel. A data information message is then transmitted on the set of time-frequency radio resources. The data information message comprises the information other than the control information.

In accordance with another embodiment, a method by a network component includes receiving, from a transmitter, control information on a downlink control channel, and receiving a data information message on a set of time-frequency radio resources associated with the downlink control channel. The set of time-frequency radio resources is used for communicating information other than the control information. The network component obtains the information other than control information from the data information message.

In accordance with another embodiment, a network component comprises at least one processor and a non-transitory computer readable storage medium storing programming for execution by the at least one processor. The programming includes instructions to arrange a set of time-frequency radio resources associated with a downlink control channel for transmitting information other than control information sent on the downlink control channel. The network component is further configured to transmit, on the set of time-frequency radio resources, a data information message comprising the information other than the control information.

In accordance with yet another embodiment, a network component comprises at least one processor and a non-transitory computer readable storage medium storing programming for execution by the at least one processor. The programming includes instructions to receive, from a transmitter, control information on a downlink control channel, and receive a data information message on a set of time-frequency radio resources associated with the downlink control channel. The set of time-frequency radio resources is used for communicating information other than the control information. The network component is further configured to obtain the information other than control information from the data information message.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
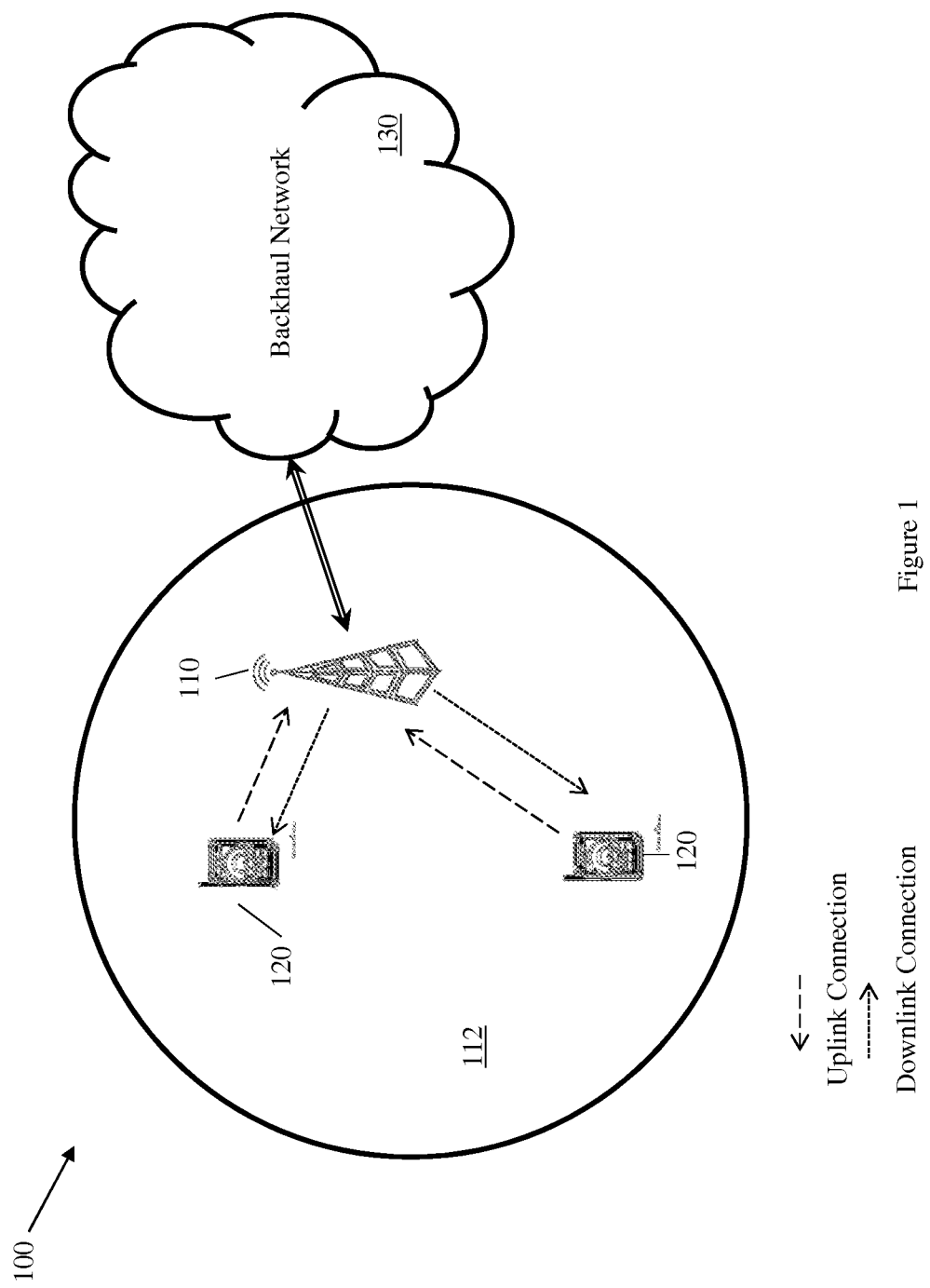
FIG. 1 illustrates a diagram of a wireless network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In dynamically transmission of data in LTE, a Physical Downlink Control Channel (PDCCH) or an Enhanced PDCCH (EPDCCH) is first decoded (by a receiver) in order to obtain a Downlink Control Information (DCI) message, which contains control information, such as downlink (DL) assignment or uplink (UL) grant) needed for subsequently receiving a PDSCH or for transmitting a Physical Uplink Shared Channel (PUSCH), respectively. However, such a two-step transmission and reception procedure could be associated with a number of issues and does not necessarily result in efficient time-frequency resource utilization for various kinds of data transmissions.

The PDCCH is transmitted in the downlink control region, located at the beginning of the subframe, which length can be adjusted dynamically, e.g., indicated by a Physical Control Format Indicator Channel (PCFICH) depending on system load. For carrier bandwidths above 10 Physical Resource Blocks (PRBs), 1, 2 or 3 OFDM symbols can be used and otherwise, 2, 3, or 4 OFDM symbols can be used as downlink control region. The adjustment resolution is thus in terms of OFDM symbols, which implies that for normal Cyclic Prefix (CP) length, the amount of time-frequency resources that is not available for the PDSCH would be in multiples of ¹⁄₁₄ or 7.1% (there are 14 OFDM symbols per subframe). Thus, situations could occur where only few UEs in the cell have data to transmit, wherein even the minimum 7.1% (or 14.2% for small bandwidths) downlink control overhead is excessive. For extended CP, a subframe has 12 OFDM symbols and the granularity would be ¹⁄₁₂ or 8.3% (or 16.6% for small bandwidths). Furthermore, for the special subframes in Time-Division Duplex (TDD), the number of OFDM symbols available for the PDSCH may be less than 12 or 14, yielding even larger control region length granularities. Thus, an unbalanced situation may occur where there is a shortage of time-frequency resources for the PDSCH, while time-frequency resources are unutilized in the control region due to the large granularity of control channel resources. The PDCCH is transmitted by means of the cell-specific reference signals (CRS).

The EPDCCH on the other hand is transmitted within an EPDCCH set comprising a number of PRB pairs. Two EPDCCH sets could be configured. The compositions of the sets are provided by higher layer signaling and do not change dynamically. For localized transmission, typically the EPDCCH is transmitted in as few as possible PRB pairs in the EPDCCH set, whereas for distributed transmission, the EPDCCH is transmitted on as many PRB pairs as possible within the EPDCCH set. An evolved NodeB (eNodeB) may schedule the PDSCH on PRB pairs of the EPDCCH set, if they are not used for EPDCCH transmission by any UE. However, the PDSCH and EPDCCH cannot be transmitted in the same PRB pair and the EPDCCH may not need to use all time-frequency resources within a PRB pair, e.g., if distributed transmission is used. Hence, situations could occur where only few UEs in the cell have data to transmit and there could be a shortage of time-frequency resources for the PDSCH while significant amounts of time-frequency resources are unutilized in the EPDCCH set. This would, for instance, become an issue for small carrier bandwidths, where a large fraction of the available PRB pairs are included in an EPDCCH set. The EPDCCH is transmitted by means of receiver-specific Demodulation-Reference Signals (DM-RSs). The statistical multiplexing gain of data and control information is reduced in the LTE system since the PDSCH may not be transmitted in the downlink control channel region or in PRB pairs containing EPDCCH.

Upon reception of a correctly received downlink assignment in the PDCCH/EPDCCH, the UE processes the PDSCH in the same subframe and transmits an acknowledgement (ACK) or negative acknowledgement (NACK) several subframes later. However, if the UE does not correctly receive the downlink assignment, it does not transmit any ACK or NACK. The eNodeB knows whether the PDCCH/EPDCCH was missed by detecting whether there is ACK or NACK transmission, or by detecting no Hybrid Automatic Repeat Request (HARQ) feedback transmission at all (using discontinuous transmission (DTX) detection), which occurs several subframes later. Hence, there are no HARQ messages for the control channels (PDCCH/EPDCCH), but only for the data channel (PDSCH). Thus, the eNodeB continues to transmit the PDSCH even in cases where the associated PDCCH/EPDCCH was missed by the UE. This two-step procedure by means of separate control channel and data channel may lead to resource wastage since there can be PDSCH transmissions which no UE will attempt to receive.

User data on the PDSCH is processed in the physical layer by means of transport blocks obtained from higher protocol layers. The size of a transport block is given by the standard specification and depends on the number of allocated PRB pairs and the modulation and coding scheme. Table 1 is an excerpt from the 3GPP TS36.213 standard showing a set of transport block sizes.

TABLE 1

Example of transport block sizes (bits) from LTE for one transmission layer.

| Modulation and coding scheme | Number of PRB pairs | | |
| --- | --- | --- | --- |
| | 1 | 2 | 3 |
| 0 | 16 | 32 | 56 |
| 1 | 24 | 56 | 88 |
| 2 | 32 | 72 | 144 |
| 3 | 40 | 104 | 176 |
| 4 | 56 | 120 | 208 |
| 5 | 72 | 144 | 224 |

Since even small transport blocks require scheduling of a number of whole PRB pairs, the transmission of small packets is inefficient. For example, if a transport block of 32 bits is to be transmitted, at least one PRB pair is needed. A PRB pair could carry up to 336 encoded bits (with normal CP, Quadrature Phase-Shift Keying (QPSK), no overhead). Using a whole PRB pair would yield a substantially low code rate, less than ¹⁄₁₀ in this case. On a carrier with a small bandwidth, e.g., comprising 6 PRB pairs, 1 PRB pair corresponds to ⅙ or 16.7% of all PDSCH resources, which is substantial for such a small transport block. Depending on the resource allocation method used, the assignable resources for PDSCH may be in multiples of PRB pairs (e.g., Resource Block Groups) and not necessarily as single PRB pairs. Thus, small transport blocks may not be efficiently transmitted on the PDSCH.

Furthermore, the transport blocks on the PDSCH are encoded by turbo codes, which are known to perform well for large transport block sizes but require complex decoding algorithms. Therefore, for other channels in LTE, where small amounts of information are transmitted, e.g., for the control channels (PDCCH/EPDCCH), tail biting convolutional codes are used instead, which have more appealing properties of performance and complexity for small data packets. In the uplink, small amount of data in terms of uplink control information can also be encoded by block codes. Hence, the encoding method for the PDSCH is not tailored to small packets.

With the increased use of smartphones, large amounts of small data packets are transmitted, which is different than traditional voice services and high data rate downloads. There are various real-world examples where such traffic overloads the system and decreases system's capacity. For example, studies and measurements of total amount of data traffic used on a network over a certain period of time, have shown that that 80% of usage lasts less than 10 seconds and 60% of usage require less than 1 kbit. Other measurements showed that 30% of the transfer sizes are less than 1 kbyte, including Transmission Control Protocol (TCP) and Internet Protocol (IP) headers.

Another example where small amount of data is transmitted is the Physical Broadcast Channel (PBCH) in LTE, wherein 14 information bits are encoded by a convolutional code. The PBCH is transmitted by CRS on a set of predetermined time-frequency resources and the PDSCH is mapped around the PBCH, e.g., the PBCH resources cannot be shared by any other channel. It has been suggested to define a new carrier type without any Common Reference Signals (CRS) for receiving the PBCH. Hence, a new mechanism is needed for conveying broadcast information in this case.

In the LTE system, the resource utilization is limited by that time-frequency resources cannot be completely and flexibly shared among the control channels (PDCCH/EPDCCH) and the data channel (PDSCH) or the broadcast channel (PBCH). This may lead to underutilization of the available resources. Furthermore, transmission of small transport blocks on the PDSCH is inefficient as one or several PRB pairs need to be allocated. Turbo coding is also not necessarily beneficial for transmission of small transport blocks.

Embodiments of this disclosure provide a new paradigm by means of a one-step approach comprising transmitting data or other non-control information messages within the downlink control channel directly, rather than in a data channel or broadcast channel. Thereby, radio resource utilization can be substantially improved in the cellular system, such as in the case of transmitting smaller data packets. Moreover, the benefit of using convolutional or block coding instead of turbo coding could be achieved for small data packets. Further applications and advantages of the embodiments of this disclosure will be apparent from the following detailed description.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays and femtocells.

In the LTE system, the PDCCH and the EPDCCH are used to transmit Downlink Control Information (DCI) messages which can contain control information for one or several UEs. A number of DCI formats are defined for different purposes: DCI formats 0/4 contain PUSCH grants; DCI formats 1/1A/1B/1C/1D/2/2A/2B/2C/2D contain PDSCH assignments; DCI formats 3/3A contain transmit power control commands for PUCCH/PUSCH; and DCI format 1A may alternatively contain an order to the UE to initiate a random access procedure.

Higher layer signaling configures the UE of which formats it should receive. The size of the DCI messages is known to the UE and may depend on carrier bandwidth and other features configured for the UE. Typical DCI message sizes could be in the order of about 20 to about 70 bits. A DCI message is transmitted on a set of time-frequency resources referred to as Control Channel Elements (CCEs) or, for EPDCCH, Enhanced CCEs (ECCEs). DCI messages can be transmitted on one or several CCEs (or ECCEs), e.g., at different aggregation levels. A large aggregation level allows using a smaller code rate, and thus the eNodeB can adapt the code rate to the link conditions. Whether there is a PDCCH/EPDCCH transmission for the UE and on which CCEs/ECCEs is not known to the UE. Hence, a UE blindly decodes a set of predetermined CCEs (or ECCEs), referred to as PDCCH (or EPDCCH) candidates, for each aggregation level, for one or several DCI messages. The set of CCEs can be UE-specific, referred to as a UE-specific search space, or can be common among several UEs, referred to as a common search space. Control information that is designated for several UEs is transmitted in the common search space.

A 16 bit CRC is attached to the DCI message which is then encoded by a convolutional code. The CRC of the DCI message is scrambled with a sequence obtained from a Radio Network Temporary Identifier (RNTI) which is assigned to the UE. Cell-specific scrambling is further applied to the PDCCH, whereas UE-specific scrambling is used for the EPDCCH. Upon correct decoding, the CRC has to be descrambled correctly and the UE can therefore determine whether the PDCCH (or EPDCCH) candidate contains a relevant DCI message intended for this UE and the purpose of this message. Different types of RNTI, both UE-specific and cell-specific, can be used depending on the purpose for the DCI. For example, the RNTI types include: C-RNTI for dynamic transmission on PDSCH; SPS-RNTI for semi-persistent transmission on PDSCH; SI-RNTI for system information transmission on PDSCH; P-RNTI for paging information transmission on PDSCH; RA-RNTI for random access response on PDSCH; TPC-PUCCH-RNTI for PUCCH power control; and TPC-PUSCH-RNTI for PUSCH power control.

Upon a correctly detected control channel (e.g., PDCCH, EPDCCH) and a detection attempt of the PDSCH, the UE may initiate a transmission of ACK or NACK in the Physical Uplink Control Channel (PUCCH). For dynamic scheduling (as opposed to Semi-Persistent Scheduling (SPS)) of the PDSCH, the PUCCH time-frequency resource to be used for carrying the acknowledgement (ACK) or Negative ACK (NACK) is derived implicitly from an enumeration of the CCEs (or ECCEs) used for transmitting the associated DCI. For TDD, the DCI also comprises a set of bits which additionally is used for determining the PUCCH resource, in case of EPDCCH transmission.

The Physical Broadcast Channel (PBCH) transmits the Master Information Block (MIB), which contains essential information for accessing a cell, e.g., carrier bandwidth (4 bits), Physical HARQ Indicator Channel (PHICH) configuration (2 bits) and the 8 most significant bits of the System Frame Number (SFN) (8 bits). The SFN comprises 10 bits and is an enumeration of a subframe. The PHICH configuration and the carrier bandwidth are needed in order to be able to determine the available CCEs for the PDCCH.

The PBCH in LTE is transmitted in the 6 central RBs (72 subcarriers) of the carrier and in the first 4 OFDM symbols of slot 1. The smallest LTE transmission bandwidth configuration of a carrier may be 6 RBs and the UE does not know the carrier bandwidth prior to detecting the PBCH. Using 6 RBs assures that the PBCH can be detected regardless of the carrier bandwidth and it provides maximum frequency diversity. The data of the PBCH is encoded by a convolutional code and a 16-bit CRC is attached to provide for error detection. The transmission time interval (TTI) of the PBCH is 40 millisecond (ms). For example, the encoded data is conveyed over 4 radio frames, using the first 4 OFDM symbols of slot 1 in each radio frame. The encoded bits are mapped such that it would be possible to correctly receive the PBCH from just 1 decoding attempt, e.g., from 1 radio frame. On the other hand, the 40 ms timing is unknown to the UE which needs to be detected. The scrambling sequence of the PBCH is defined over 40 ms, hence the UE can blindly detect the 40 ms timing, even from 1 decoding attempt (requiring 4 decoding hypotheses). Once the 40 ms timing is detected, the 2 least significant bits of the SFN can be obtained. Having a transmission time of 40 ms spreads the broadcast message over several radio frames and assures that time-diversity can be achieved, e.g., in order to avoid fading dips.

The PBCH is transmitted on the CRS ports. The number of CRS antenna ports can be 1, 2 or 4 but is unknown to the UE prior to detecting the PBCH. Transmit diversity is used for the PBCH when there is more than 1 CRS port. For 2 CRS ports, Space Frequency Block Coding (SFBC) is applied and, for 4 CRS ports, a combination of SFBC and Frequency Switched Transmit Diversity (FSTD) is used. The UE blindly detects the number of CRS ports by de-mapping the resource elements (REs), of the PBCH under the 3 hypotheses of 1, 2 or 4 CRS ports and corresponding diversity scheme. The PBCH is always mapped to the REs assuming 4 CRS ports are used. That is, the REs defined for antenna ports p=0-3 are never used to carry the PBCH, regardless of the number of actually configured antenna ports. The CRC is scrambled with a sequence being dependent on the number of CRS ports. Hence, the UE can verify if the correct number of CRS ports has been detected.

Embodiments of this disclosure discloses a method in a transmitter (and a corresponding method in receiver) to use a downlink control channel of a cellular system (e.g., PDCCH/EPDCCH in LTE systems) for transmitting data information message(s) comprising other information than control information to mobile users, e.g., user-data information, broadcast information, or any information other than control information carried on control channels. As used herein, the term non-control information refers to any information other than network control information typically carried on control channels, such as PDCCH and EPDCCH. The non-control information can include user data information, broadcast information, or other non-control information. Thus, in contrast to systems where the downlink control channel includes DCI, embodiments described herein accommodate transmitting data or other non-control information in the downlink control channel.

In the method, a set of time-frequency radio resources associated with a downlink control channel is arranged (by the network or a network controller) so that the set can be used by the transmitter for transmission of user data, broadcast information, or other non-control information. The arrangement may include defining resources, e.g., a search space, wherein such transmissions may occur and informing the receiver about the arrangement, e.g., by signaling and/or by predetermined rules, or any other necessary actions related to downlink transmissions. Hence, the transmitter transmits the data or other non-control information message(s) in the downlink on said set of time-frequency radio resources. At the receiver side, the data information messages are received on said set of time-frequency radio resources associated with a downlink control channel, and the information messages are thereafter processed for further use by the receiver.

Figure 6:
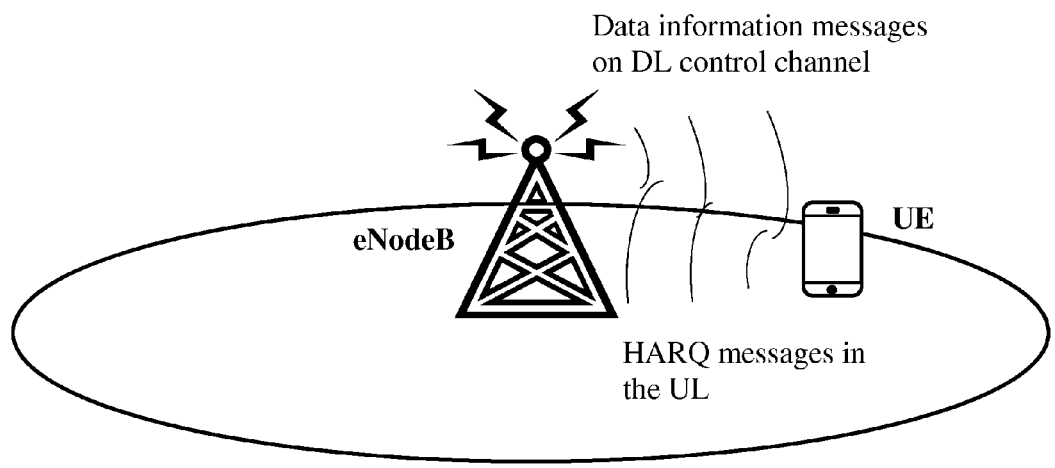
FIG. 6 illustrates a diagram of an embodiment of downlink transmissions in a cellular system.

FIG. 6 shows a system overview in which an eNodeB, in this LTE example, transmits data, broadcast, or other non-control information messages in the downlink to a UE on a control channel. The data information messages may be modulated with a predetermined modulation format, e.g., Phase Shift Keying (PSK), such as e.g., BPSK, QPSK, 8-PSK, etc. When implemented in an LTE system, QPSK may be used for this purpose in PDCCH and EPDCCH.

It should further be noted that embodiments of this disclosure may be applicable in any cellular wireless communication system in which network nodes are arranged to transmit control information in downlink control channels, and is therefore not limited to the exemplary cellular systems in the present disclosure. The embodiments improve the resource utilization and flexibility of the system (with the use of LTE terminology), where available control channel resources not associated with downlink or uplink control information transmission can be utilized for transmission of data or other non-control information. Thereby, more flexibility of sharing resources between data/non-control and control transmission can be achieved in the system.

Further, the transmission of smaller data packets can be made efficient as allocation of an unproportional large amount of data channel (PDSCH) resources is avoided. The consequences of an undetected downlink control channel are also reduced as data channel (PDSCH) resources do not need to be scheduled, and the benefit of using convolutional or block coding instead of turbo coding could be achieved for small data packets. The method above is also advantageous for transmitting broadcast information. For instance, the PBCH utilizes a number of fixed time-frequency resources which cannot be utilized by any other signal. This implies that certain reference signals (Channel-State Information RS (CSI-RS), Positioning RS (PRS), DM-RS) cannot be transmitted if overlapping with the PBCH. This problem could be reduced if the broadcast information is transmitted in the downlink control channel, as described above.

In embodiment scenarios where the CRS is not transmitted, which implies that the PBCH cannot be transmitted, a new mechanism based on DM-RS demodulation is used for transmitting the MIB (or an Enhanced MIB). This can be achieved by transmitting, for example, the MIB in the EPDCCH.

According to an embodiment, at least one time-frequency resource is predefined/predetermined such that the receiver does not need to blindly decode all control channel candidates. The set of predefined/predetermined time-frequency resources comprise, for example, a predetermined control channel candidate on a given aggregation level. This is advantageous if the data transmission includes broadcast information since it avoids performing blind detections in the cell access procedure. In that case, since the receiver needs to be able to retrieve the broadcast information prior to knowing the carrier bandwidth, the used time-frequency resources are confined to the minimum carrier bandwidth supported by the system, e.g., 6 resource blocks in LTE. Even if the time-frequency resources are predefined for transmission of data information, these resources can be shared and alternatively be used for transmission of DCI messages. Thereby, the resource utilization is improved. A predefined/predetermined time-frequency resource could be determined by rules known to both the transmitter and receiver and additional signaling may not be required to specify the resource.

According to another embodiment, at least one time-frequency resource is not predefined/predetermined. This allows some more flexibility in arranging the resources while it may require the receiver to search for (e.g., blindly decode) the transmitted control channel candidates. In yet another embodiment, the time-frequency resources consist of multiple control channel candidates from a given search space. This allows full flexibility in multiplexing DCI messages and data information messages on the control channel. Consequently, better resource utilization is possible in this case. In order to further limit the searching complexity, it is possible to only apply the method to a subset of the time-frequency resources and/or a subset of the aggregation levels. Such restrictions could be predetermined such that no signaling is needed to indicate it to the receiver.

The time-frequency resources may be located within the user-specific search space. This supports transmitting user-specific data in the control channel, which enables the system to transmit transport blocks either on the data channel (e.g., PDSCH) or in the downlink control channel (e.g., PDCCH/EPDCCH). A further benefit, in case the EPDCCH is used for transmitting the data information message, is that the merits of using DM-RS based transmission are always applicable, e.g., receiver-specific beamforming, even though that would not be possible on the PDSCH (e.g., if the configured transmission mode utilizes CRS-based PDSCH transmission). For example, in some transmission modes, the PDSCH is transmitted with CRS, which may not be as flexible.

In yet another embodiment, the time-frequency resources are located within the common search space. This allows transmitting cell-specific data in the control channel, such as broadcast information. A further example is where the receiver-specific data is transmitted in a common search space and higher layer signaling indicates which parts of the data information message a particular user should consider. As such, all users are able to decode the data packet but each user only extracts the parts which the higher layer signaling indicates.

One application of using the common search space is where the data information message comprises broadcast information, such as the MIB. This is particularly useful on a carrier type where there is no CRS, implying that the PBCH and PHICH cannot be transmitted. The broadcast information (e.g., an Enhanced MIB) on such a carrier can be different from the MIB on a legacy LTE carrier, as the PHICH configuration is not needed. It is thus possible to include also the 2 least significant bits of the SFN without increasing the Enhanced MIB size compared to the MIB. An advantage of this implementation is that the UE may not need to perform blind decoding in order to obtain the 2 least significant bits of the SFN. Alternatively, if the 2 least significant bits of the SFN are not contained in the Enhanced MIB, a longer Transmission Time Interval (TTI) can be used (e.g., 40 ms) implying lower code rates. Additionally, an Enhanced MIB may contain information related to defining a common EPDCCH search space.

Blind decoding refers to a scheme in which different time-frequency locations of a DCI are tested as well as different DCI message sizes. For example, for a given configured transmission mode in LTE, the receiver monitors two DCI formats which may have different sizes. In one example, the message size (number of bits) of the data information message is the same as the number of bits of an existing DCI message which the user is configured to decode. Thus, no additional blind decoding is needed for decoding the data information since no new message size is introduced.

In a further embodiment, the message size of the data information message is the same as the number of bits of a transport block for the PDSCH. This provides the advantage of using the same packet segmentation procedures on higher layers as current LTE system. Optionally, the size can be the same as the number of bits of an existing DCI message which the user can be configured to decode. If the size of the data packet (transport block) is smaller than the DCI message, bits can be padded to align the sizes.

Figure 2:
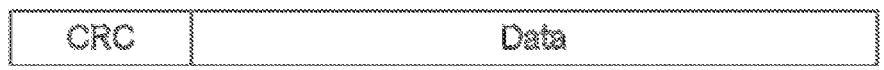
FIG. 2 illustrates a diagram of an embodiment data information message comprising a CRC part and a data part.
Figure 3:
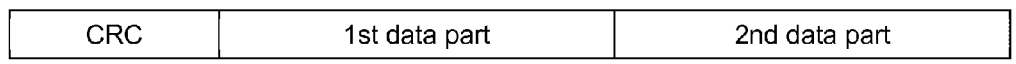
FIG. 3 illustrates a diagram of an embodiment data information message comprising a CRC and two data parts.
Figure 4:
FIG. 4 illustrates a diagram of an embodiment data information message comprising two data parts with a respective Cyclic Redundancy Check (CRC)

FIG. 2 shows an embodiment message that comprises a CRC and a data (or other non-control) information message that is transmitted using time-frequency radio resources associated with a downlink channel. In one example, the data information message comprises 1 transport block. FIG. 3 shows a non-limiting example where the data information message comprises multiple data parts (e.g., more than one transport block) and where the information messages are concatenated. Other ways of concatenation (e.g., interleaving) to arrange the data parts are also possible. FIG. 4 shows another embodiment message that comprises more than 1 data part (e.g., transport block), where each transport block is associated with a separate CRC. Other ways of concatenation (e.g., interleaving) to arrange the data parts are possible.

For cases where the data or non-control information message comprises user-specific information, a dedicated receiver-specific RNTI can be used to scramble the CRC of the message. One example is to use a new type of RNTI (e.g., different from that of the C-RNTI) for control channel messages that contain data information. As such, the user can determine whether the received message amounts to control information or data information (e.g., a transport block).

Another example is to reuse the C-RNTI, which can limit the need of allocating and signaling additional RNTIs and avoid having to use multiple RNTIs when verifying the CRC code. If the C-RNTI is used, there is a need to ensure that the user/receiver is able to determine whether it has decoded a control message or a data/non-control information message. This could be facilitated by constraining the control message and data/non-control information message to have different sizes. The message type can then be determined by blind decoding. The differentiation can also be achieved by using another polynomial for computing the CRC and/or using a particular interleaving or scrambling on the data information message prior to computing the CRC. If such scrambling or interleaving is different for data/non-control information messages and control messages, it would be possible to use the same size for the data/non-control information message and the control message while still being able to determine the message type, e.g., data/non-control information or control information.

A further option to determine the message type (assuming the message types at least are transmitted using the same RNTI) is to define a set of predefined rules for certain bits in the message to allow identifying the message type. For example, the control information in the DCI consists of a number of information fields and not all combinations of values may be simultaneously possible. Hence, a rule can be implemented where certain bits are set to predefined values in a data information message and the predefined bits are chosen such that the combination could not be possible in a control message.

If the data information comprises broadcast information, e.g., an Enhanced MIB, a common broadcast RNTI can be used to scramble the CRC of the message. This broadcast RNTI (e.g., a cell-specific scrambling sequence) can be pre-defined and known to all UEs in the system. Additionally, a cell-specific scrambling sequence can be applied on the data information message (instead of the current UE-specific scrambling sequence used for EPDCCH), if the data information message is transmitted in a common search space. Hence, the broadcast information can be received by all users in the cell.

Embodiments of this disclosure may be beneficial for smaller data information messages. A CCE can accommodate 72 bits. For aggregation levels 1, 2, 4 and 8, the PDCCH is capable of conveying up to 72, 144, 288 and 576 encoded bits, respectively. Thus, with a large aggregation level, it is possible to provide sufficiently low code rates even for small data packets. For the EPDCCH, the size of the ECCE can be similar to that of a CCE, but may differ depending on other configured signals. EPDCCH aggregation levels 16 and 32 are possible in some instances, suggesting that it is possible to provide low code rates even for small data packets. For example, with aggregation levels 32 and 72 bits per ECCE, 2304 encoded bits can be transmitted.

In LTE systems, Reed-Muller block codes of length 32 and 20 are specified, which are used to encode control information in the uplink. The largest payload is 48 bits (PUCCH Format 3) which utilizes a concatenation of length 32 codes. The systems also include tail biting convolutional coding of rate 1/3, which is used for both uplink and downlink control information and the broadcast channel. In such case, the data/non-control information messages can be encoded using the same method above for the downlink control channel, e.g., using tail biting convolutional codes. This may enable lower detection complexity in the receiver and, in some cases, better decoding performance, compared to the use of a turbo code.

Furthermore, the modulation and coding scheme (MCS) of the control channel are designed for coverage instead of capacity. In other words, the MCS is designed such that the transmissions can be received at any location within the coverage area. In the case where the UE is closer to the base station, the radio channel is not used efficiently because the channel quality can support a more aggressive MCS scheme. In an embodiment, superposition coding can be used. In this case, the first layer of the superposition code is used to encode the control/data channel such that the channel can be received at any location within the coverage area. For the cases where the UEs are closer to the base station, a second layer of the code can be used to encode additional data. A separate CRC can be sent in the second layer so that the receiver can determine if it has received the second layer correctly. The UE can be informed if such a second layer is transmitted. In one embodiment, the signaling that informs the UE that data is sent may also inform the UE to attempt to decode the second layer. In another embodiment, an explicit signal is embedded in the signaling of the first layer to inform the UE to attempt to decode the second layer. In yet another embodiment, the indication to the UE to detect the additional layer can be sent via higher layer signaling.

If the receiver fails to decode the control channel (e.g., PDCCH/EPDCCH), e.g., the CRC code does not check correctly, the DTX scheme can be applied. In LTE, the eNodeB may thus initiate a retransmission in a later subframe. If the receiver succeeds in decoding the control channel and the message contained data, an ACK is sent. The corresponding time-frequency resource in the uplink control channel could thus be derived implicitly from the used time-frequency resource (CCEs/ECCEs) of the associated downlink control channel. Additionally, the data/non-control information message may contain certain bits (e.g., as for EPDCCH in TDD) to further determine the time-frequency resource in the uplink control channel. These bits would be available to the receiver if the control channel is correctly detected. Alternatively, HARQ signaling can be used in a shared uplink data channel (e.g., PUSCH).

Figure 5:
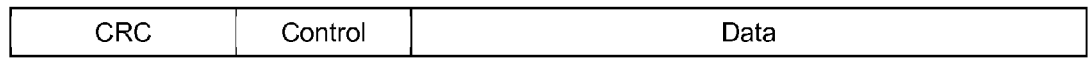
FIG. 5 illustrates a diagram of an embodiment data information message comprising a CRC, a data part, and control information.

FIG. 5 shows a message that comprises a CRC, a data/non-control information message and a set of additional bits comprising information for at least determining time-frequency resources in an uplink control channel. If the information message comprises one CRC and more than one data part, a single ACK can be transmitted, when both information messages are correctly received. If the information message comprises one CRC for each data part, multiple ACKs can be transmitted, e.g., one ACK per data part. In this case, it may also be possible to send a NACK for a data part that was not correctly received.

For the receiver, the detection of the HARQ signaling in the uplink control channel is simplified and consists of monitoring whether there is any signal energy on the designated control channel resource (which would correspond to a single ACK) or if there is no signal energy (which would correspond to DTX). Such a detector may be implemented by comparing the received signal energy with a threshold, and declaring ACK for a received signal energy above the threshold, or DTX otherwise. The threshold may be set according to certain requirements on maximum false alarm probabilities. The method is further applicable to semi-persistent scheduling wherein the HARQ resources are semi-statically configured in the PUCCH.

Figure 7:
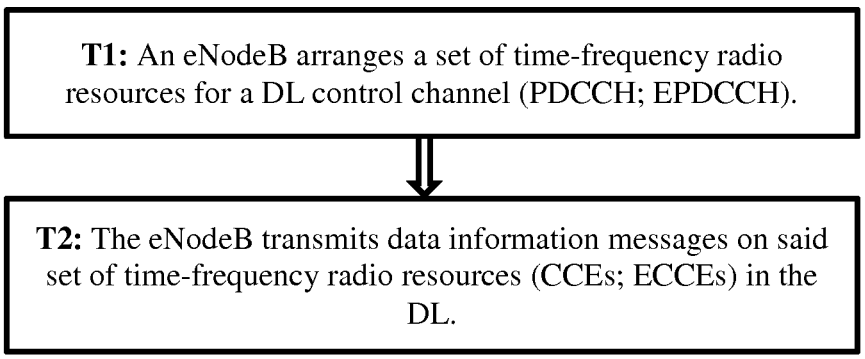
FIG. 7 illustrates a flowchart of an embodiment method for operating a transmitter.
Figure 8:
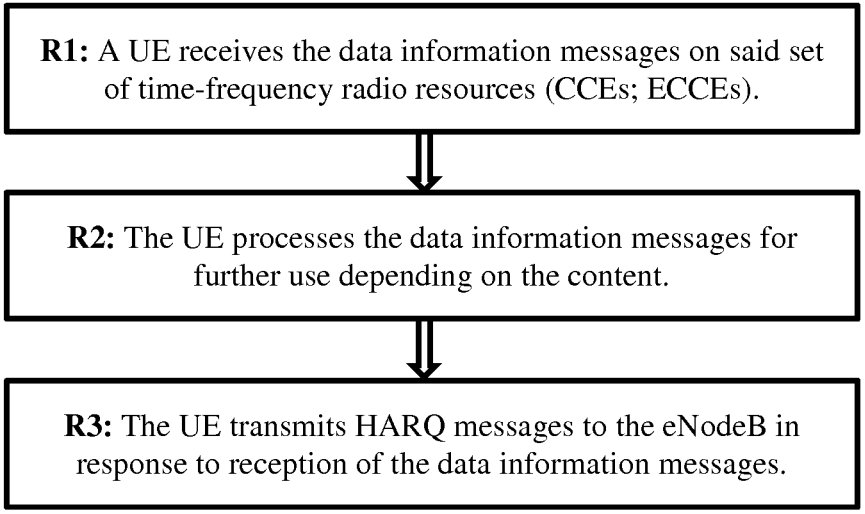
FIG. 8 illustrates a flowchart of an embodiment method for operating a receiver.

FIGS. 7 and 8 show flowcharts of a method in a transmitter and a method in a receiver, respectively. The system in this example is a 3GPP LTE system (as shown in FIG. 6 for example) and the transmission is performed in the downlink from an eNodeB (or a relay node) to a UE. In step T1 (FIG. 7), the eNodeB arranges a set of time-frequency radio resources associated with a DL control channel, e.g., PDCCH or Enhanced PDCCH. Before the arranging step the eNodeB may be preparing transmissions by encoding the data, broadcast, or other non-control information messages and performing associated processing, e.g., CRC attachment, scrambling, modulation, or other processing. In step T2, the eNodeB transmits the data/non-control information messages on the set of time-frequency radio resources in the downlink. This can be achieved by mapping the data information message on time-frequency resources (CCEs/ECCEs) in the downlink control channel, and transmitting the data information messages in the downlink control channel.

In step R1 (FIG. 8), the UE receives the data/non-control information messages on the set of time-frequency radio resources and performs the usual method steps in the receiver, such as detection, demodulation, decoding, or other processing. In step R2, the UE processes the information messages and uses the information, e.g., for software related processing, or other processing. In step R3, the UE transmits HARQ messages to the eNodeB in the uplink in response to reception of the information messages in step R1.

The methods/techniques described herein may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, aspects of this disclosure also relates to a transmitter device and a corresponding receiver device. Mentioned devices comprise the necessary functional in the form of means, units, and elements. to execute any method according to aspects of this disclosure. Mentioned means, units, elements, may include memory, processing circuitry, coupling means, antenna means, precoding unit, amplifier unit, or other units. The present transmitter may according to an embodiment be an eNodeB (e.g. a base station) or a relay node, and the present receiver may be a UE in the LTE system.

The transmitter device is arranged for transmitting data information messages in the downlink of a cellular wireless communication system. The transmitter device comprises an arranging unit arranged for arranging a set of time-frequency radio resources associated with a downlink control channel, and a transmitting unit arranged for transmitting data information message(s) on the time-frequency radio resources. The transmitter processes different communication signals and transmits signals over physical antennas using a transmit unit which, e.g., comprises processing circuitry, precoder, MIMO antennas, amplifiers, etc. The transmitter device may also comprise a receiver unit for receiving uplink signals from mobile users.

The receiver device is arranged for receiving data information messages in the downlink of a cellular wireless communication system. The receiver device comprises a receiving unit arranged for receiving at least one data information message transmitted by the transmitter device on a set of time-frequency radio resources associated with a downlink control channel. The receiver device unit may comprise antennas, decoders, demodulators, etc.

The cellular wireless communication system covers a geographical area which is divided into cell areas, with each cell area being served by a transmitter, also referred to as a radio network node or base station, e.g., a Radio Base Station (RBS), eNB, eNodeB, NodeB or B node, depending on the technology and terminology used. Sometimes, also the expression cell may be used for denoting the transmitter/radio network node itself. However, the cell is also, or in normal terminology, the geographical area where radio coverage is provided by the transmitter/radio network node at a base station site. One transmitter, situated on the base station site, may serve one or several cells. The transmitters communicate over the air interface operating on radio frequencies with the receivers within range of the respective transmitter.

A receiver, also known as UE in LTE systems, mobile station, wireless terminal and/or mobile terminal is enabled to communicate wirelessly in a cellular wireless communication system. The receiver may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity.

In some radio access networks, several transmitters may be connected, e.g., by landlines or microwave, to a Radio Network Controller (RNC), e.g., in Universal Mobile Telecommunications System (UMTS). The RNC, also sometimes termed Base Station Controller (BSC), e.g., in Global System for Mobile Communications (GSM), may supervise and coordinate various activities of the plural transmitters connected thereto. In 3rd Generation Partnership Project (3GPP) Long Term Evolution (LTE), transmitters, which may be referred to as eNodeBs or eNBs, may be connected to a gateway, e.g., a radio access gateway, to one or more core networks.

Furthermore, the processing circuitry of the transmitter or receiver devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processing circuitry" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 9:
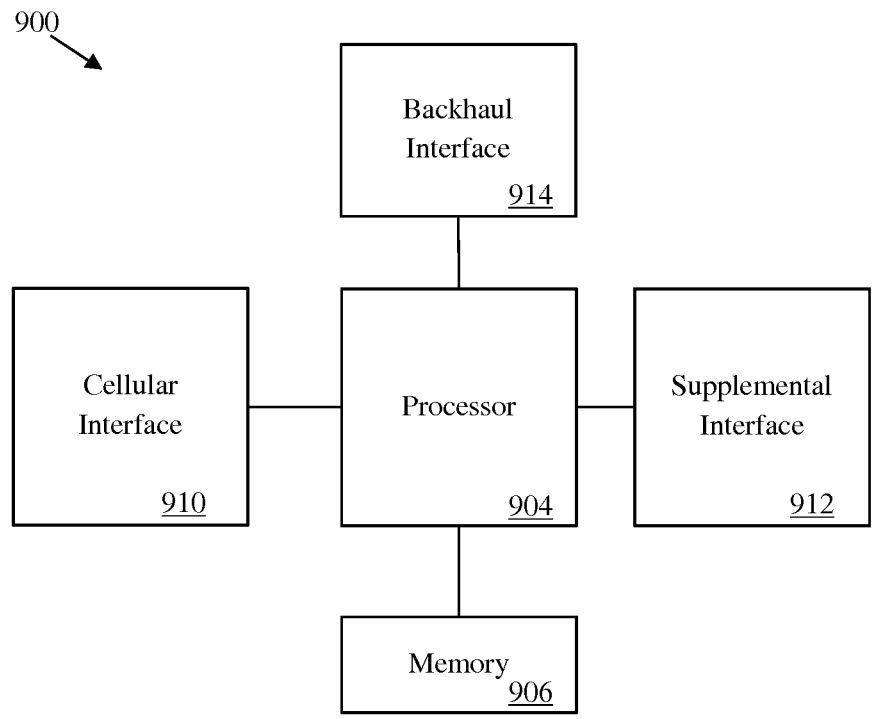
FIG. 9 illustrates a block diagram of an embodiment communications device.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental interface 912, and a backhaul interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental interface 912 may be any component or collection of components that allows the communications device 900 to communicate data or control information via a supplemental protocol. For instance, the supplemental interface 912 may be a non-cellular wireless interface for communicating in accordance with a Wireless-Fidelity (Wi-Fi) or Bluetooth protocol. Alternatively, the supplemental interface 912 may be a wireline interface. The backhaul interface 914 may be optionally included in the communications device 900, and may comprise any component or collection of components that allows the communications device 900 to communicate with another device via a backhaul network.

Figure 10:
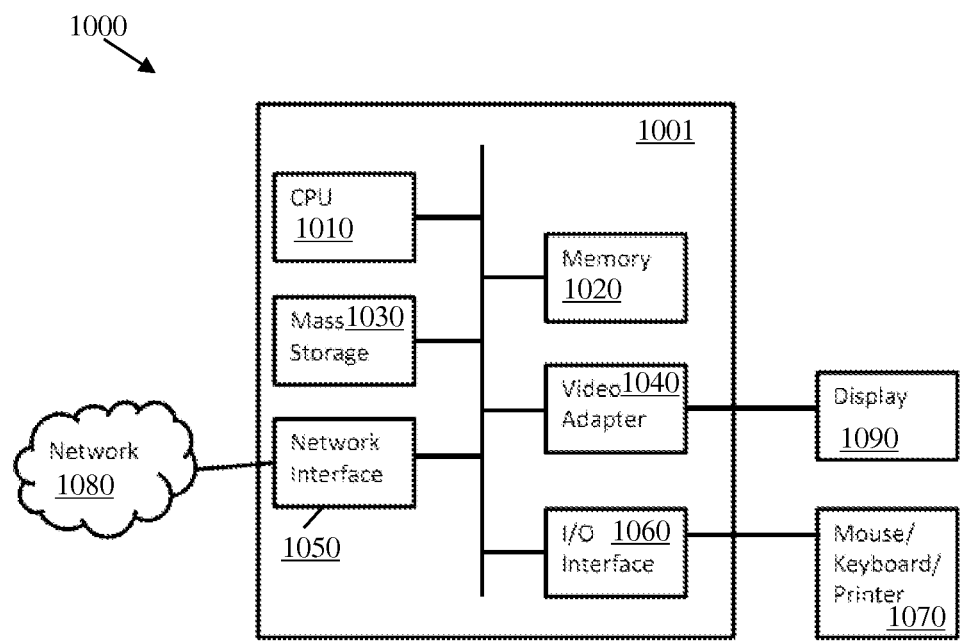
FIG. 10 is a diagram of a processing system that can be used to implement various embodiments.

FIG. 10 is a block diagram of a processing system 1000 that can be used to implement various embodiments. For instance the processing system 1000 can be part of an eNB a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component, the method comprising:
    arranging a set of time-frequency radio resources, associated with a downlink control channel, for transmitting information other than control information sent on the downlink control channel; and
    transmitting, on the set of time-frequency radio resources, a data information message comprising the information other than the control information, wherein the data information message has a size that is the same as a size of at least one of a transport block for a Physical Downlink Shared Channel (PDSCH) or a downlink control information (DCI) message transmitted on the downlink control channel, the size of the transport block being pre-determined according to a wireless communications standard, wherein the information other than the control information is user-specific data information, and wherein the method further comprises:
    scrambling a Cyclic Redundancy Check (CRC) code using a dedicated user- specific Radio Network Temporary Identifier (RNTI):
    encoding, using a superposition coding, the user-specific data information into a first data layer detectable within a coverage area and a second data layer comprising additional data; and
    sending the scrambled CRC code with the user-specific data information in the data information message.

2. The method of claim 1, further comprising transmitting control information on other time-frequency radio resources associated with the downlink control channel.

3. The method of claim 1, wherein at least one time-frequency radio resource of the set of time-frequency radio resources is predefined to a receiver.

4. The method of claim 1, wherein at least one time-frequency radio resource of the set of time-frequency radio resources is not predefined to a receiver.

5. The method of claim 1 further comprising signaling, to a receiver, at least one time-frequency radio resource of the set of time-frequency radio resources.

6. The method of claim 1, wherein at least one time-frequency radio resource of the set of time-frequency radio resources is defined in a one of a user-specific search space for the downlink control channel and a common search space for the downlink control channel.

7. The method of claim 1, wherein the information other than the control information comprises one of user-specific data information and broadcast data information.

8. The method of claim 7, wherein transmitting, on the set of time-frequency radio resources, the information other than the control information comprises one of sending the user-specific data information in a transport block and sending the broadcast data information in at least a portion of a Master Information Block (MIB).

9. The method of claim 1, wherein the downlink control channel is one of a Physical Downlink Control Channel (PDCCH) and an Enhanced PDCCH (EPDCCH), and wherein the set of time-frequency radio resources corresponds to Control Channel Elements (CCEs) or Enhanced CCEs (ECCEs).

10. The method of claim 1, wherein the dedicated user-specific RNTI is a cell-RNTI that is user-specific.

11. The method of claim 1, further comprising computing the CRC using a specific polynomial associated with the data information message.

12. The method of claim 1, further comprising implementing one of a specific interleaving and a specific scrambling associated with the data information message prior to computing the CRC.

13. The method of claim 1, wherein the data information message includes at least one predefined bit that is set to a predefined value distinguishing the data information message from a control information message.

14. The method of claim 1 further comprising indicating, via higher layer signaling to a receiver, which part of the data information message the receiver should receive.

15. The method of claim 1, wherein the information other than the control information is broadcast information, and wherein the method further comprises:
scrambling a Cyclic Redundancy Check (CRC) code using a broadcast Radio Network Temporary Identifier (RNTI); and
sending the scrambled CRC code with the broadcast information in the data information message.

16. The method of claim 15, wherein the broadcast RNTI is pre-defined and known to a plurality of receivers.

17. The method of claim 15, wherein the data information message is transmitted over a plurality of subframes by a plurality of transmissions.

18. The method of claim 17 further comprising scrambling the data information message by a sequence corresponding to the subframes.

19. The method of claim 15, wherein the scrambling is in accordance with a cell-specific scrambling sequence applied to the data information message.

20. The method of claim 1 further comprising encoding the data information message by convolutional codes or by block codes.

21. The method of claim 1 further comprising modulating the data information message with a Phase Shift Keying (PSK) scheme.

22. The method of claim 1, wherein the network component is one of a base station and a relay node.

23. A network component comprising:
at least one processor; and
a non-transitory computer readable storage medium storing programming for execution by the at least one processor, the programming including instructions to:
arrange a set of time-frequency radio resources associated with a downlink control channel for transmitting information other than control information sent on the downlink control channel; and
transmit, on the set of time-frequency radio resources, a data information message comprising the information other than the control information, wherein the data information message has a size that is the same as a size of at least one of-a transport block for a Physical Downlink Shared Channel (PDSCH) or a downlink control information (DCI) message transmitted on the downlink control channel, the size of the transport block being pre-determined according to a wireless communications standard; and
wherein the information other than the control information is user-specific data information, and the programming includes further instructions to:
scramble a Cyclic Redundancy Check (CRC) code using a dedicated user- specific Radio Network Temporary Identifier (RNTI);
encode, using a superposition coding, the user-specific data information into a first data layer detectable within a coverage area and a second data layer comprising additional data; and
send the scrambled CRC code with the user-specific data information in the data information message.

24. The network component of claim 23, wherein the network component corresponds to one of an Evolved Universal Terrestrial Radio Access (E-UTRA) communications network and a Long Term Evolution (LTE) communications network.

25. A method, comprising:
transmitting, by a network component and on one or more first time-frequency radio resources associated with a downlink control channel, a user-specific data information message comprising non-control information; and
transmitting, by the network component, control information on one or more second time-frequency radio resources that are associated with the downlink control channel and that are different from the one or more first time-frequency radio resources;
wherein the user-specific data information message has a size that is the same as a size of at least one of a transport block for a Physical Downlink Shared Channel (PDSCH) or a downlink control information (DCI) message transmitted on the downlink control channel, the size of the transport block being pre-determined according to a wireless communications standard, wherein the non-control information is user-specific data information, and wherein the method further comprises:
scrambling a Cyclic Redundancy Check (CRC) code using a dedicated user- specific Radio Network Temporary Identifier (RNTI);
encoding, using a superposition coding, the user-specific data information into a first data layer detectable within a coverage area and a second data layer comprising additional data: and
sending the scrambled CRC code with the user-specific data information in the user-specific data information message.

26. The method of claim 25, further comprising determining the one or more first time-frequency radio resources prior to the transmitting the user-specific data information message.

27. The method of claim 25, wherein the method further comprises scrambling a Cyclic Redundancy Check (CRC) code using a dedicated user-specific Radio Network Temporary Identifier (RNTI); and
wherein the transmitting the user-specific data information message comprises sending the scrambled CRC code with user-specific data information in the user-specific data information message.

28. A device, comprising:
transmitter;
at least one processor; and
a non-transitory computer readable storage medium storing programming for execution by the at least one processor, the programming including instructions to:
cause the transmitter to transmit, on one or more first time-frequency radio resources associated with a downlink control channel, a user-specific data information message comprising non-control information; and cause the transmitter to transmit control information on one or more second time-frequency radio resources that are associated with the downlink control channel and that are different from the one or more first time-frequency radio resources;

wherein the data information message has a size that is the same as a size of at least one of a transport block for a Physical Downlink Shared Channel (PDSCH) or a downlink control information (DCI) message transmitted on the downlink control channel, the size of the transport block being pre-determined according to a wireless communications standard;

wherein the non-control information is user-specific data information, and the programming includes further instructions to:

scramble a Cyclic Redundancy Check (CRC) code using a dedicated user- specific Radio Network Temporary Identifier (RNTI);

encode, using a superposition coding, the user-specific data information into a first data layer detectable within a coverage area and a second data layer comprising additional data; and send the scrambled CRC code with the user-specific data information in the user-specific data information message.

29. The device of claim 28, wherein the programming further includes instructions to determine the one or more first time-frequency radio resources prior to causing the transmitter to transmit the user-specific data information message.

30. The device of claim 28, wherein the programming further includes instructions to scramble a Cyclic Redundancy Check (CRC) code using a dedicated user-specific Radio Network Temporary Identifier (RNTI); and wherein the instructions to cause the transmitter to transmit the user-specific data information message comprises instructions to send the scrambled CRC code with user-specific data information in the user-specific data information message.

\* \* \* \* \*